J. HANNAN.
HOG-TROUGH.

No. 178,435. Patented June 6, 1876.

Witnesses:
Henry Eichling
Fred E. Bond

Inventor:
Joseph Hannan
By Fitch & Fitch
His Attys.

UNITED STATES PATENT OFFICE.

JOSEPH HANNAN, OF CASS TOWNSHIP, JONES COUNTY, IOWA.

IMPROVEMENT IN HOG-TROUGHS.

Specification forming part of Letters Patent No. 178,435, dated June 6, 1876; application filed October 11, 1875.

*To all whom it may concern:*

Be it known that I, JOSEPH HANNAN, of Cass township, Jones county, and State of Iowa, have invented an Improvement in Hog-Troughs, of which the following is a specification, reference being had to the accompanying drawings forming part hereof.

My invention consists in a roofed trough for hog-feeding, constructed with partitions dividing the trough into stalls, which communicate with each other through passages or openings in said partitions formed at the bottom of the trough, and provided with hinged doors extending the length of the trough, one upon the exterior or man side, and the other upon the interior or pen side of the trough, arranged in combination with a section of the fence of the pen, as hereinafter particularly described.

Figure 1:
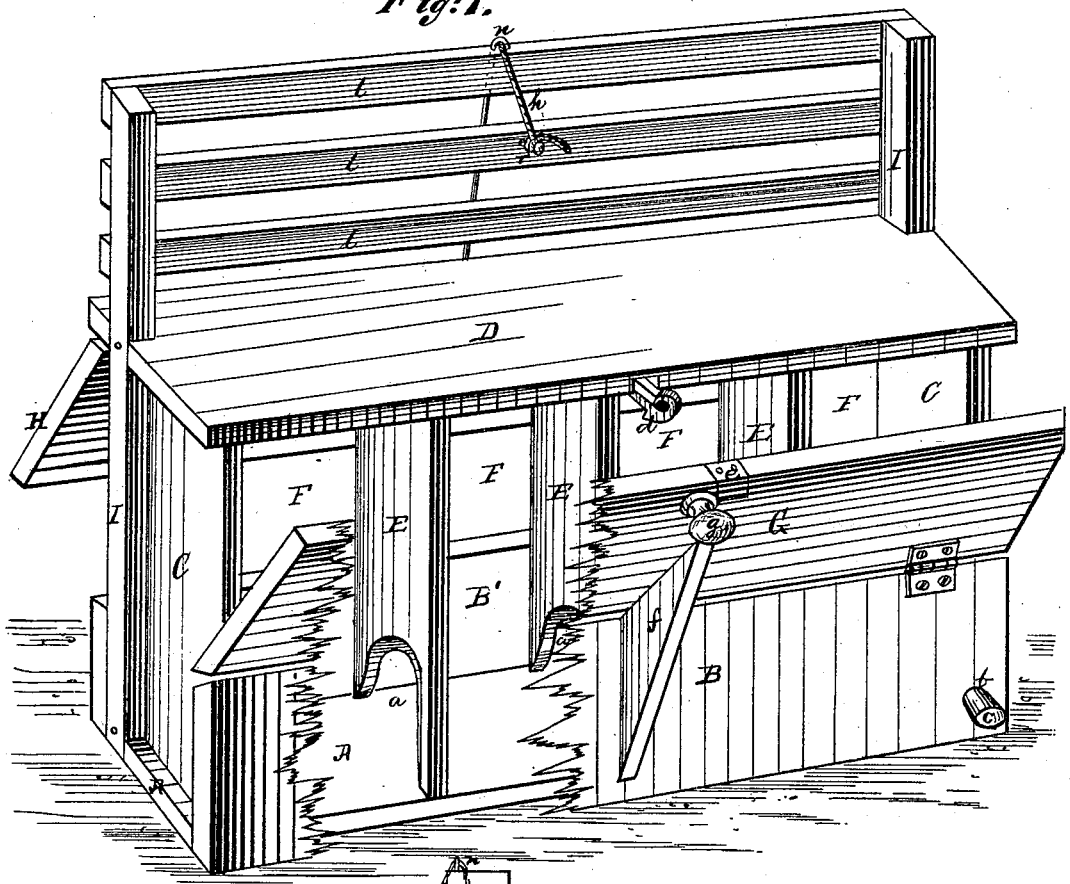
Figure 2:
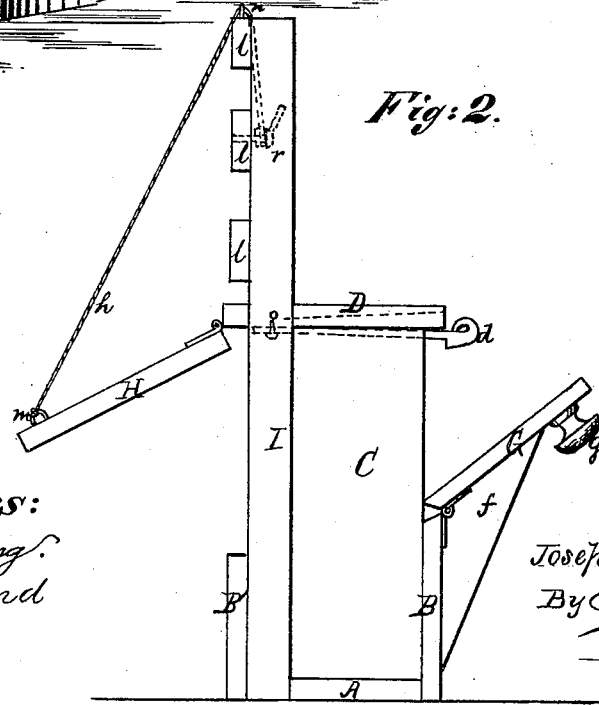

Figure 1 is an exterior or man-side view of a trough embodying my invention. Fig. 2 is an end view of the same.

The trough is constructed with the base or bottom board A, and the longitudinal side boards B and B', on the front and rear of the trough, respectively, the former extending upward somewhat higher than the latter, as shown, and with the end pieces C, which support the roof D. The partitions E divide the trough into stalls F, arranged to permit but one hog to feed in each stall at any one time, and the said partitions have the semicircular openings $a$ at the bottom of the trough to permit the feed to pass from one stall to another. An opening, $b$, closed by a bung, $c$, is provided at one end of the trough, on the exterior or front side, for the escape of water during the washing of the trough. The door G is hinged to the board B on the front of the trough, and extending the entire length thereof, and is arranged to close the opening between the board B and the roof-piece D, and to be retained thus closed up by the spring-catch $d$, fixed in the roof, engaging against the metal angle-plate $e$ set on the upper edge of the door, as shown; or to be opened downward and rest upon the triangular brace $f$, which is fixed on the front of the board B, thus forming a swill-board, in the position shown, for the convenient pouring of the feed into the stalls. The door H is hinged to the roof-piece D on the rear or pen side of the trough, and extending the entire length thereof, and is arranged to close the opening between the board B' and the roof-piece, or to be opened upward into the position shown in the drawings, and thus form a shelter for the trough and stock from the sun and weather when the stock is feeding. The door G is provided with the knob $g$, and the door H is provided with the rope $h$ secured to it by the staple $m$, and passing through the staple $n$ on the top of the pen to the front side, where it is conveniently secured upon the hook or spike $r$, whereby both doors may be readily operated to be opened or closed from the front or man side of the trough.

By keeping the trough-doors G and H closed when the stock is not feeding fowls or other animals are prevented from entering the trough, and it is kept free from dirt and vermin, or rain-washings and all similar impurities, which render the feed unfit for the stock, and breed trichina or other diseases in hogs.

The trough has combined with it a section of the fence or pen, composed of the upright posts I, which are secured to the end pieces C, and are let into the bottom A and roof-piece D at either end of the trough, and on the edge nearest the pen side, as shown, and which carry the rails $l$ extending longitudinally across the trough, as shown.

I am aware that a hog-trough has been heretofore constructed with an adjustable and reversible rack for dividing the feed side of the trough into sections, and by which the size of the openings into the trough for the stock may be varied.

I do not intend to claim this device, but wish to limit my claim hereunder to the parts I believe to be new.

What I claim as my invention, and desire to secure by Letters Patent, is—

1. In a hog-trough, having the roof D and partitions E, with lower end openings $a$, the hinged door G extending the length of the trough on its exterior side, and provided with a brace, $f$, and catch $d$, whereby the said doors, when open, will act as a swill-board, and when closed will exclude the snow, rain, &c., as described.

2. A hog-trough composed of the bottom A, ends C, sides B and B', and roof D, and having the partitions E and doors G and H, when the same is combined with posts I and cross-boards l, whereby the entire structure is adapted to form a part of the pen or inclosure, as described.

JOSEPH HANNAN.

Witnesses:
J. L. SHEEAN,
H. F. KEELER.